United States Patent
Fukumoto

(10) Patent No.: US 8,403,014 B2
(45) Date of Patent: Mar. 26, 2013

(54) MOTORCYCLE TIRE FOR UNEVEN TERRAIN TRAVEL

(75) Inventor: Toru Fukumoto, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 365 days.

(21) Appl. No.: 12/675,723

(22) PCT Filed: May 16, 2008

(86) PCT No.: PCT/JP2008/059050
§ 371 (c)(1),
(2), (4) Date: Feb. 26, 2010

(87) PCT Pub. No.: WO2009/031340
PCT Pub. Date: Mar. 12, 2009

(65) Prior Publication Data
US 2010/0224302 A1 Sep. 9, 2010

(30) Foreign Application Priority Data
Sep. 5, 2007 (JP) ................................. 2007-230521

(51) Int. Cl.
*B60C 9/00* (2006.01)
*B60C 9/02* (2006.01)
(52) U.S. Cl. ............ 152/548; 152/451; 152/556; 57/902
(58) Field of Classification Search .................. 152/450, 152/451, 556; 57/902
See application file for complete search history.

(56) References Cited

U.S. PATENT DOCUMENTS

| | | | |
|---|---|---|---|
| 3,851,692 A | 12/1974 | Takemura et al. | |
| 4,390,052 A * | 6/1983 | Mendiola et al. | 152/538 |
| 4,832,102 A * | 5/1989 | Domchick | 152/527 |
| 5,025,845 A * | 6/1991 | Iino et al. | 152/559 |
| 6,089,295 A | 7/2000 | Komatsuki et al. | |
| 6,273,164 B1 | 8/2001 | Kuwahara | |

FOREIGN PATENT DOCUMENTS

| | | |
|---|---|---|
| JP | 61-166706 A | 7/1986 |
| JP | 63-195004 A | 8/1988 |
| JP | 10-297211 A | 11/1998 |
| JP | 2000-16017 A | 9/2000 |
| JP | 2002-029212 A | 1/2002 |
| JP | 2003-267002 A | 9/2003 |

* cited by examiner

*Primary Examiner* — Justin Fischer
(74) *Attorney, Agent, or Firm* — Birch, Stewart, Kolasch & Birch, LLP

(57) ABSTRACT

A motorcycle tire for uneven terrain travel including two carcass plies, at least one of which is aramid ply 16 using aramid fiber cord 17 obtained by subjecting N (2 to 4) bundles 18 of aramid fiber "f" to final twist, the aramid fiber cord 17 having a total fineness D of 2,200 to 5,010 dtex and a twist factor T represented by the equation (1):

$$T = n \times (\sqrt{D}) \times 10^{-3} \quad (1)$$

in which n is the number of final twists per 10 cm of the cord (unit: time), and D is a total fineness of the cord (unit: dtex), the twist factor falling within the range of:

in the case where the aramid ply 16 is inner carcass ply 6A, from 2.8 to 3.2 when the number of filament bundles 18 is 2, and from 2.4 to 3.2 when the number of filament bundles 18 is 3 or 4, and in the case where the aramid ply 16 is outer carcass ply 6B, from 2.4 to 3.2 when the number of filament bundles 18 is 2, and from 2.2 to 3.2 when the number of filament bundles 18 is 3 or 4.

2 Claims, 4 Drawing Sheets

MOTORCYCLE TIRE FOR UNEVEN TERRAIN TRAVEL

TECHNICAL FIELD

The present invention relates to a motorcycle tire for traveling on uneven terrain wherein an aramid fiber cord having a specific twist factor is used in a carcass, thereby enhancing both damping performance and cornering performance while securing durability.

BACKGROUND ART

For improving traveling performance on uneven terrain, it is particularly important to improve damping performance of a tire which is a performance of absorbing an external force received from irregularity of a road surface, and handling performance in cornering. Therefore, in conventional motorcycle tires for traveling on uneven terrain, it has been attempted to achieve both the damping performance and the handling performance by forming a carcass from a plurality of carcass plies with use of a cord of a low modulus fiber such as nylon fiber, rayon fiber or polyester fiber as a carcass cord, while adjusting thickness of the carcass cord and number of the cords per unit length.

DISCLOSURE OF THE INVENTION

Problem to be Solved by the Invention

In recent years, further improvement in the traveling performance on uneven terrain is strongly demanded with development of high performance vehicles. However, the conventional technique mentioned above has a limit and has not been able to sufficiently respond to the above demand. Thus, the present inventor proposed to use a high modulus aramid fiber in a carcass cord. Since the aramid fiber has a feature that loss tangent is large (i.e., energy loss is large), it is advantageous for the damping performance. However, since the aramid fiber is inferior in fatigue resistance against input on compression side, deformation of a tire becomes very large particularly when it is used as a carcass cord of a motorcycle tire for uneven terrain travel which is used under a low inner pressure condition, so there arises a problem that cord breaking may occur and therefore the tire durability is impaired.

Accordingly, it is an object of the present invention to provide a motorcycle tire for traveling on uneven terrain, which can improve the damping performance by utilizing the feature of aramid fiber that the loss tangent is large and, in addition, which can exhibit an excellent handling performance in cornering, while securing a tire durability by enhancing the fatigue resistance of the aramid fiber. The present invention is based on using an aramid fiber cord having a specific twist factor T as a carcass cord.

It is disclosed in the following Patent Literature 1 that various cords, e.g., cords of an organic fiber such as polyester, nylon, rayon or aramid, and metal cords, are suitably used as a carcass cord of motorcycle tires.
Patent Literature 1: JP 2002-29212 A

Means to Solve the Invention

The invention as claimed in claim 1 of the present application is directed to a motorcycle tire for uneven terrain travel having a carcass extending from a tread portion to bead cores in bead portions through sidewall portions, said carcass comprising two carcass plies superposed in a radial direction of the tire as inner and outer carcass plies, in which carcass cords are arranged at an angle of 20 to 40° with respect to a circumferential direction of the tire and are covered with a topping rubber, at least one of said inner and outer carcass plies being an aramid ply using, as a carcass cord, an aramid fiber cord in which N (2 to 4) bundles of first-twisted aramid filaments are subjected to final twist, said aramid fiber cord having a total fineness D of 2,200 to 5,010 dtex and a twist factor T which is represented by the equation (1):

$$T = n \times (\sqrt{D}) \times 10^{-3} \tag{1}$$

in which n is the number of final twists per 10 cm of the cord, and D is a total fineness of the cord (unit: dtex), and which falls within the following range:

(a) a twist factor T within the range of 2.8 to 3.2 when said aramid ply is the inner carcass ply and the number N of filament bundles is 2, (b) a twist factor T within the range of 2.4 to 3.2 when said aramid ply is the inner carcass ply and the number N of filament bundles is 3 or 4, (c) a twist factor T within the range of 2.4 to 3.2 when said aramid ply is the outer carcass ply and the number N of filament bundles is 2, (d) a twist factor T within the range of 2.2 to 3.2 when said aramid ply is the outer carcass ply and the number N of filament bundles is 3 or 4.

EFFECTS OF THE INVENTION

In the present invention, as mentioned above, an aramid fiber cord having a twist factor T restricted within a predetermined range is used in at least one of two carcass plies which form a carcass. If the twist factor T is less than the predetermined range, damages such as cord breaking occurs due to lack of fatigue resistance of the cord, and the damping performance cannot be sufficiently enhanced since tire rigidity becomes too large and accordingly the characteristics of the aramid fiber that the loss tangent is large is not utilized. If the twist factor T is more than the predetermined range, elongation property of the cord becomes large to invite lack of tire rigidity, so the handling performance in cornering is impaired.

It is necessary that the twist factor T range to be applied is different between an aramid fiber cord having a two-bundle twisted structure and an aramid fiber cord having a three or four-bundle twisted structure. Further, it is necessary to select the twist factor T from different ranges depending on whether an aramid fiber cord is used in outer one or inner one of two carcass plies.

EXPLANATION OF SYMBOLS

Figure 1:
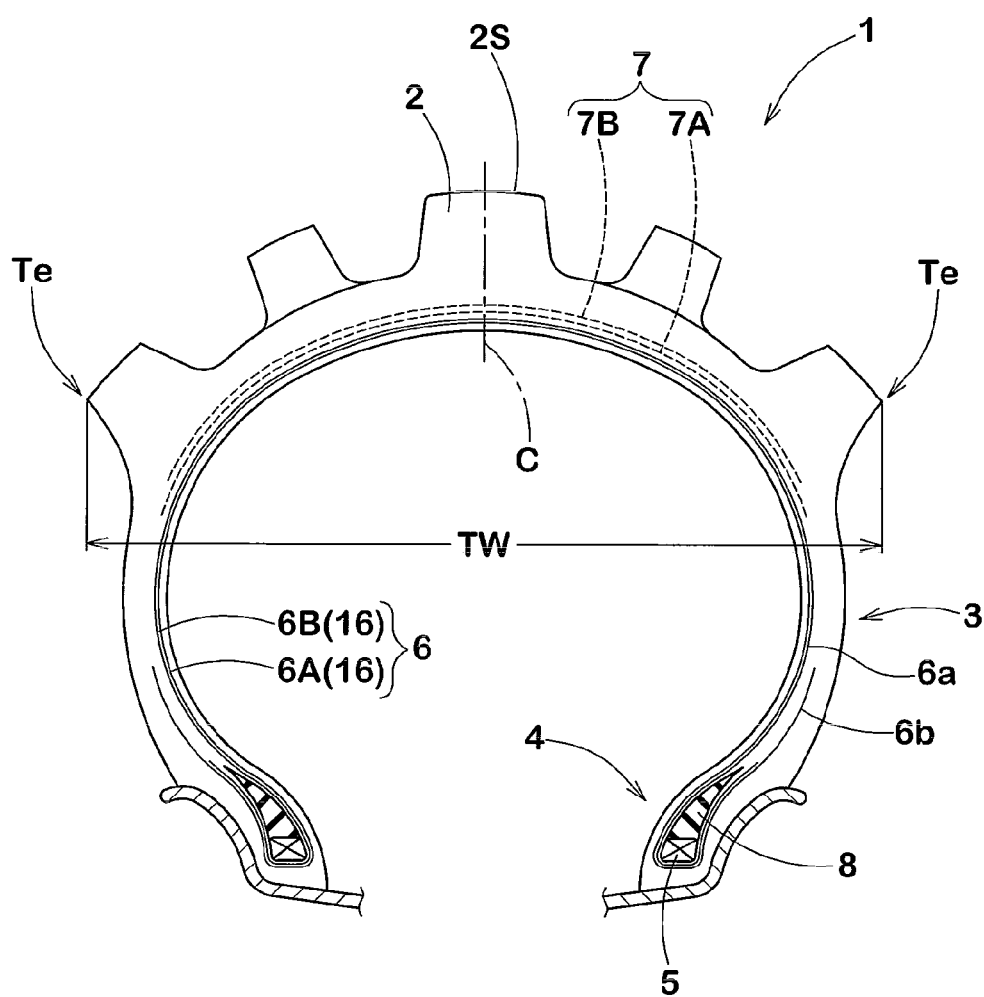
FIG. 1 is a cross sectional view showing an motorcycle tire for uneven terrain travel according to an embodiment of the present invention.

2. Tread portion
3. Sidewall portion
4. Bead portion
5. Bead core
6. Carcass
6A, 6B. Carcass ply
6C. Carcass cord
16. Aramid ply
17. Aramid fiber cord
18. Bundle of filaments
f. Aramid fiber

BEST MODE FOR CARRYING OUT THE INVENTION

An embodiment of the present invention will now be explained with reference to the accompanying drawings. FIG. 1 is a cross section view of a motorcycle tire for uneven terrain travel according to the present invention.

As shown in FIG. 1, the motorcycle tire 1 for traveling on uneven terrain (herein after referred to as "tire" 1) in this embodiment includes a carcass 6 extending from a tread portion 2 to bead cores 5 in bead portions 4 through sidewall portions 3, and a breaker layer 7 disposed radially outward of the carcass 6 in the tread portion 2. The tread portion 2 has a curved tread surface 2S extending in a convex circular arc shape from tire equator C toward tread edges Te. A tread width TW which is a distance between the tread edges Te, Te provides the maximum width of the tire, thereby enabling cornering at a large bank angle.

The carcass 6 is formed of two carcass plies superposed in a radial direction of the tire, i.e., inner carcass ply 6A and outer carcass ply 6B. Each of the carcass plies 6A and 6B is composed of a toroidal ply body portion 6a that extends between the bead cores 5, 5, and ply turnup portions 6b that are continuous with the ply body portion 6a and are turned up around the bead cores 5 from the axially inside to the axially outside of the tire to thereby anchor the carcass ply. Between the ply body portion 6a and the ply turnup portion 6b is disposed a bead apex 8 made of a hard rubber which extends radially outwardly from the bead core 5 in a tapered manner, thereby reinforcing a portion from the bead portion 4 to the sidewall portion 3.

Figure 2:
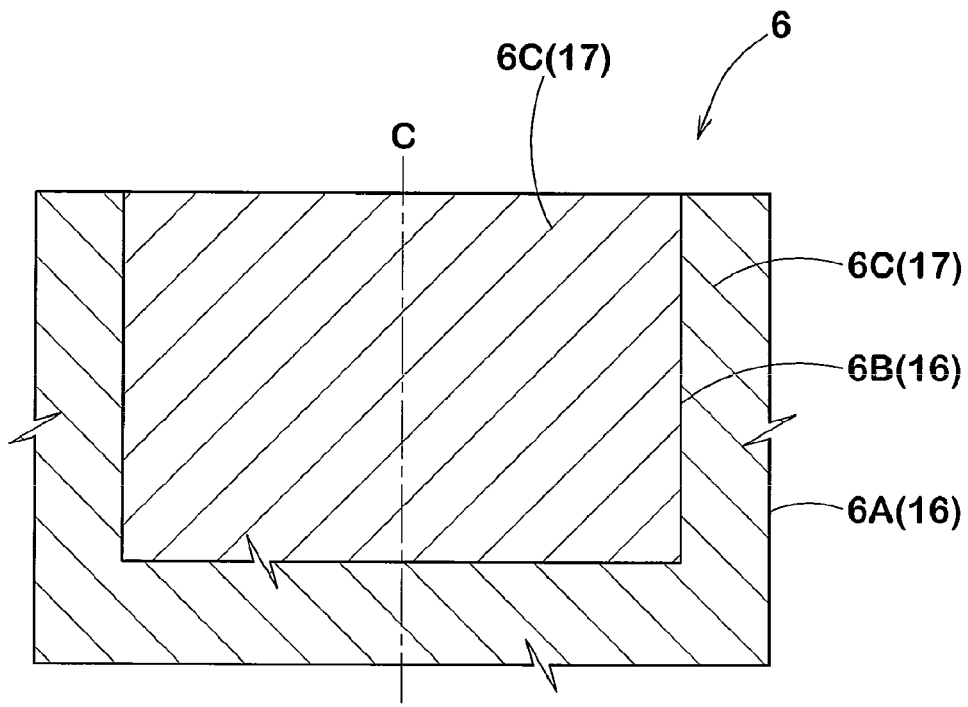
FIG. 2 is a development view conceptually showing a cord arrangement of a carcass.

As shown schematically in FIG. 2, each of the carcass plies 6A and 6B is formed of a sheet-like body in which an array of carcass cords 6C obliquely arranged at an angle of 20 to 40° with respect to a circumferential direction of the tire are covered with a topping rubber. This carcass 6 has a cross ply structure that the carcass cords 6C in one ply extend to intersect with the carcass cords 6C in the other ply, thereby securing a tire rigidity required for traveling under a low inner pressure.

The breaker layer 7 is formed of at least one breaker ply in which an array of breaker cords obliquely arranged at an angle of 15 to 40° with respect to the circumferential direction of the tire are covered with a topping rubber. The breaker layer 7 in this embodiment is formed of two breaker plies 7A and 7B. In the breaker layer 7, the breaker plies are stacked so that the breaker cords in one ply cross the cords in the other ply, whereby the rigidity of the breaker is enhanced to reinforce the tread portion 2 as well as protection of the carcass 6 against injury. As a breaker cord are suitably used those used in conventional tires, such as nylon fiber cord, polyester fiber cord and other fiber cords.

In the tire 1 of the present invention, an aramid ply 16 is applied to at least one of inner and outer carcass plies 6A and 6B in order to achieve both the damping performance and the cornering performance on high levels while securing a durability. In this embodiment, the aramid ply 16 is used in both carcass plies 6A and 6B.

Figure 3:
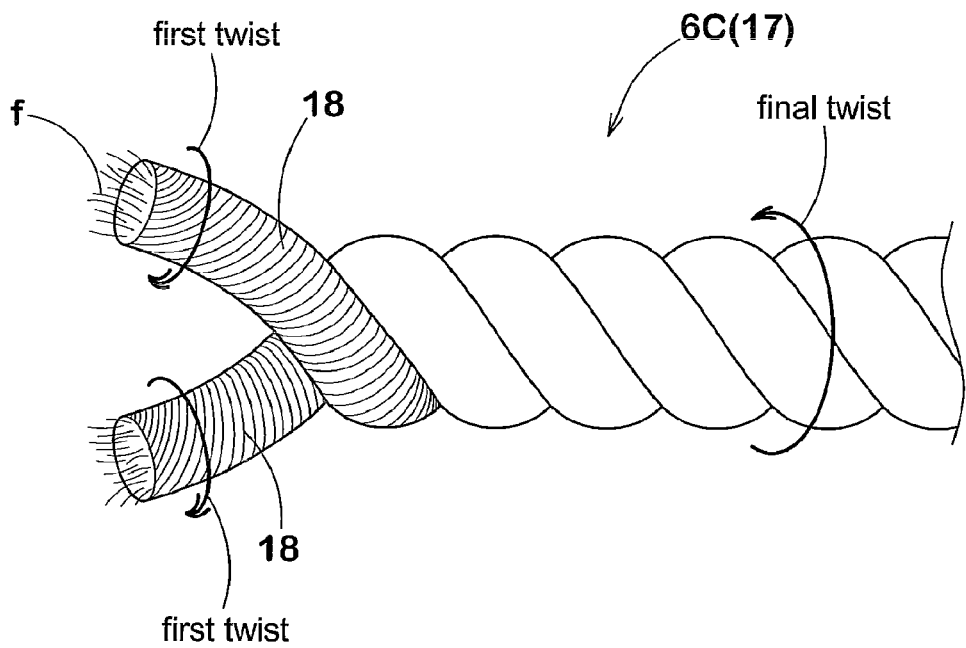
FIG. 3 is a perspective view showing an aramid fiber cord (carcass cord) having two-bundle twisted structure.
Figure 4:
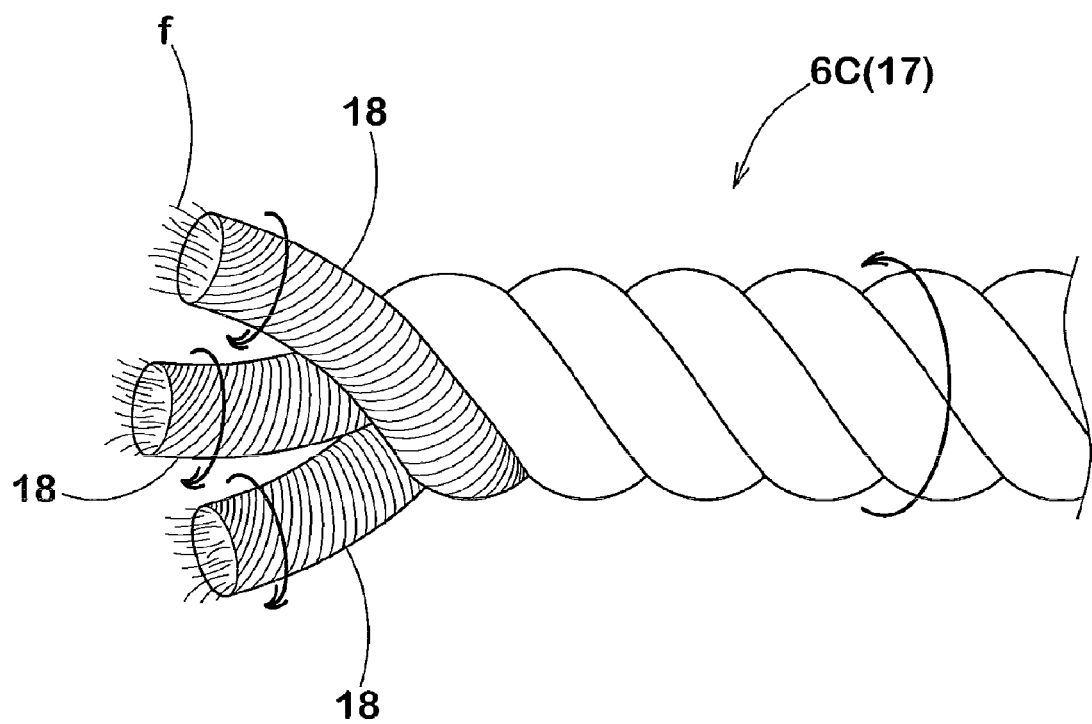
FIG. 4 is a perspective view showing an aramid fiber cord (carcass cord) having three-bundle twisted structure.
Figure 5:
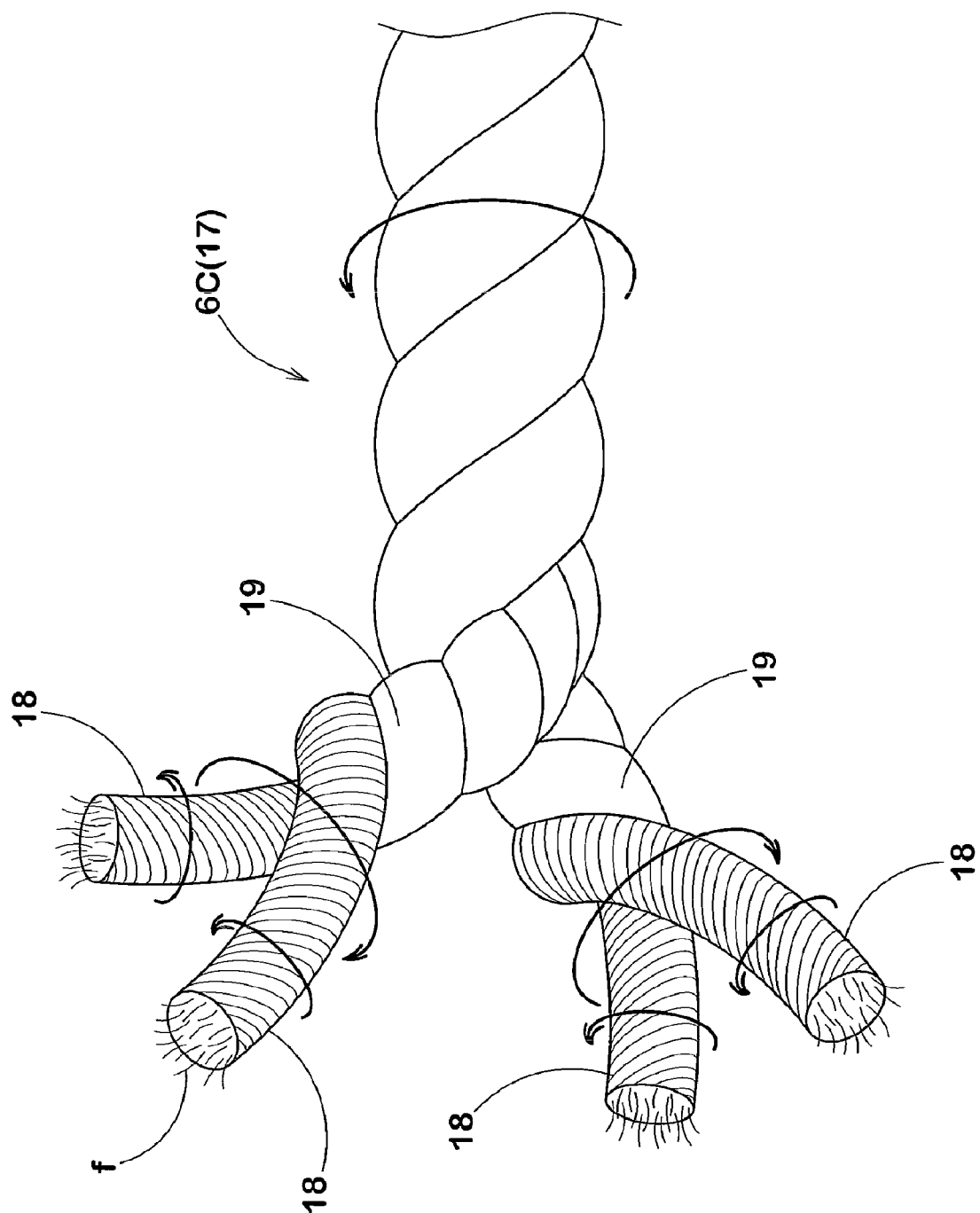
FIG. 5 is a perspective view showing an aramid fiber cord (carcass cord) having five-bundle twisted structure.

The aramid ply 16 is a ply using an aramid fiber cord 17 as a carcass cord 6C. In the aramid fiber cord 17, as shown in FIGS. 3 to 5, N (2 to 4) bundles (bundles 18) of first-twisted filaments of aramid fiber "f" are subjected to final twist. FIG. 3 shows a two-bundle twist in which two (N=2) bundles of filaments are twisted together, and FIG. 4 shows a three-bundle twist in which three (N=3) bundles of filaments are twisted together. Further, FIG. 5 shows a four-bundle twist in which four (N=4) bundles of filaments are twisted together. In this embodiment, two filament bundles 18 are secondly twisted together to form a strand 19, and two strands 19 are then subjected to final twist. It is preferable that the number of first twists and the number of final twists are identical to each other, and are also identical to the number of second twists.

The aramid fiber is advantageous for the damping performance, since the loss tangent thereof is large (i.e., energy loss is large). On the as other side, the aramid fiber tends to be inferior in fatigue resistance owing to high elasticity. Therefore, in a tire traveling on uneven terrain having large unevenness under a low inner pressure condition, deformation of a tire becomes very large, so cord breaking may occur in an early stage. Therefore, twist factor T of a cord represented by the equation (1):

$$T = n \times (\sqrt{D}) \times 10^{-3} \qquad (1)$$

in which n is the number of final twists per 10 cm of the cord (unit: time), and D is a total fineness of the cord (unit: dtex), is regulated as follows:

(a) the twist factor T is selected from a range of 2.8 to 3.2 when the aramid ply 16 is an inner carcass ply 6A and the number N of filament bundles 18 is 2,
(b) the twist factor T is selected from a range of 2.4 to 3.2 when the aramid ply 16 is an inner carcass ply 6A and the number N of filament bundles 18 is 3 or 4,
(c) the twist factor T is selected from a range of 2.4 to 3.2 when the aramid ply 16 is an outer carcass ply 6B and the number N of filament bundles 18 is 2, and
(d) the twist factor T is selected from a range of 2.2 to 3.2 when the aramid ply 16 is an outer carcass ply 6B and the number N of filament bundles 18 is 3 or 4.

Specifically, in the case that the aramid ply 16 is used in both the inner and outer carcass plies 6A and 6B as in this embodiment, the twist factor T for the inner carcass ply 6A (aramid ply 16) is restricted within the range of 2.8 to 3.2 when the number N of filament bundles 18 in the aramid fiber cord 17 is 2 (two bundle twist). If the twist factor T is less than 2.8, damages such as cord breaking occurs due to lack of fatigue resistance of the cord. Furthermore, since the tire rigidity becomes too large, the characteristics of the aramid fiber that the loss tangent is large is not utilized, so the damping performance cannot be sufficiently enhanced. On the other hand, if the twist factor T is more than 3.2, elongation property of the cord becomes too large, so it leads to lack of tire rigidity and the handling performance in cornering is impaired. Therefore, for achieving both the damping performance and the cornering performance on high levels while securing a durability, it is necessary to restrict the twist factor T within the range of 2.8 to 3.2.

When the number N of filament bundles 18 in the aramid fiber cord 17 is increased from 2 to 3 or 4, the amount of twist of the aramid fiber is increased even if the twist factor T is the same and, therefore, the fatigue resistance is improved and it is possible to lower the lower limit of the twist factor T for the improvement of the fatigue resistance as compared with the case of N=2. Therefore, the twist factor T for the inner carcass ply 6A (aramid ply 16) is restricted within the range of 2.4 to 3.2 when the number N of filament bundles 18 in the aramid fiber cord 17 is 3 or 4.

Further, in the outer carcass ply 6B (aramid ply 16), the twist factor T is restricted within the range of 2.4 to 3.2 when the number N of filament bundles 18 in the aramid fiber cord 17 is 2. The reason is that when the tire is deformed, an input on compression side less acts on the outer carcass ply 6B as compared with the inner carcass ply 6A and cord breaking owing to fatigue is hard to occur. Therefore, it is possible to lower the lower limit of the twist factor T for less occurrence of cord breaking as compared with the inner carcass ply 6A. Therefore, in the outer carcass ply 6B (aramid ply 16), the twist factor T is restricted within the range of 2.4 to 3.2 when the number N of filament bundles 18 in the aramid fiber cord 17 is 2, and within the range of 2.2 to 3.2 when the number N of filament bundles 18 in the aramid fiber cord 17 is 3 or 4. In this case, too, both the damping performance and the cornering performance can be achieved on high levels while securing the durability.

It is also necessary that the total fineness D of the aramid fiber cord 17 falls within the range of 2,200 to 5,010 dtex. If the total fineness D is less than 2,200 dtex, the cord is too thin to obtain a sufficient tire rigidity even if the number of cords per unit length is increased, so it is difficult to simultaneously achieve both the damping performance and the cornering performance at high levels. Further, since the amount of deformation of the tire increases, the durability is deteriorated. If the total fineness D is more than 5,010 dtex, the thickness of the topping rubber becomes large since the cord diameter is large, so the tire weight increases to lead to deterioration of steering stability and increase of cost.

If the above-mentioned requirements (a) to (d) are satisfied, aramid fiber cord 17 to be used in the inner carcass ply 6A and aramid fiber cord 17 to be used in the outer carcass ply 6B can be formed into the same cord wherein the total fineness D, the number N of filament bundles, the number "n" of twists and the twist factor T are constant between the both cords 17. Of course, they may be different cords wherein at least one of the total fineness D, the number N of filament bundles, the number "n" of twists and the twist factor T is different. In case of using different aramid fiber cords, it is preferable that the aramid fiber cord 17 used in the outer carcass ply 6B has a smaller twist factor T than the aramid fiber cord 17 used in the inner carcass ply 6A.

The carcass 6 can also be formed such that only one of the inner and outer carcass plies 6A and 6B is an aramid ply 16 and the other carcass ply 6A or 6B is a non-aramid ply wherein a non-aramid fiber cord selected from a nylon fiber cord, a rayon fiber cord and a polyester fiber cord is used as a carcass cord 6C. In this case, too, it is possible to simultaneously achieve both the damping performance and the cornering performance on high levels while securing the durability. In case of using the aramid ply in combination with the non-aramid ply, the total fineness D of the non-aramid fiber cord is larger than that of the aramid fiber cord 17, and the twist factor T of the non-aramid fiber cord is smaller than that of the aramid fiber cord 17.

While a particularly preferable embodiment of the present invention has been described in detail, the present invention can be practiced with various changes and modifications without being limited to the embodiment shown in the drawings.

EXAMPLES

Motorcycle tires for uneven terrain travel (tire size 120/80-19) having the structure shown in FIG. 1 were manufactured using carcass cords having the specifications shown in Tables 1 to 8. The tires were tested with respect to steering stability (damping performance and cornering performance) and durability. The results are shown in Table 1. Specifications of tires other than the carcass cords are common to all tires.

<Carcass>
Ply: inner and outer carcass plies
Carcass cord: shown in Table 1
Cord angles: +30°, −30°
Number of cords in ply: 50 cords/5 cm
(1) Steering Stability (Damping Performance and Cornering Performance)

A test tire was attached to the rear wheel of a 250 cc motorcycle under the conditions of rim 19×2.15 and internal pressure 80 kPa, and was run on an uneven terrain test course. The damping performance and cornering performance were evaluated by driver's feeling. The evaluation was made by a five point method in which 3.0 point was imparted to the result a conventional tire of Comparative Example 2. The larger the value, the better the performance. In the test, a commercially available tire having a size of 90/100-21 was used for the front wheel.

(2) Durability

The above-mentioned motorcycle was run on the uneven terrain test course for 4 hours. The tire was dismantled, and presence of breaking of carcass cord was visually observed. If at least one cord breaking is present, the breaking is rated as present (yes). If no cord breaking occurs in this durability test, a level of durability required in general market can be satisfied.

TABLE 1

|  | Com. Ex. 1 Carcass ply | | Com. Ex. 2 Carcass ply | | Com. Ex. 3 Carcass ply | | Com. Ex. 4 Carcass ply | | Com. Ex. 5 Carcass ply | | Com. Ex. 6 Carcass ply | |
| --- | --- | --- | --- | --- | --- | --- | --- | --- | --- | --- | --- | --- |
|  | inner | outer | inner | outer | inner | outer | inner | outer | inner | outer | inner | outer |
| <Carcass cord> | | | | | | | | | | | | |
| Cord material | Rayon | | Rayon | | Rayon | | Polyester | | Polyester | | Polyester | |
| Cord structure | 1840/2 | | 1840/2 | | 1840/2 | | 1670/2 | | 1670/2 | | 1670/2 | |
|  | (FIG. 3) | | (FIG. 3) | | (FIG. 3) | | (FIG. 3) | | (FIG. 3) | | (FIG. 3) | |
| Total fineness (dtex) | 3680 | | 3680 | | 3680 | | 3340 | | 3340 | | 3340 | |

TABLE 1-continued

|  | Com. Ex. 1 Carcass ply | | Com. Ex. 2 Carcass ply | | Com. Ex. 3 Carcass ply | | Com. Ex. 4 Carcass ply | | Com. Ex. 5 Carcass ply | | Com. Ex. 6 Carcass ply | |
|---|---|---|---|---|---|---|---|---|---|---|---|---|
|  | inner | outer | inner | outer | inner | outer | inner | outer | inner | outer | inner | outer |
| Number of first twist/Number of final twist (time/10 cm) | 41/41 | | 48/48 | | 48/48 | | 31/31 | | 38/38 | | 45/45 | |
| Twist factor T | 2.5 | | 2.9 | | 3.3 | | 1.8 | | 2.2 | | 2.6 | |
| <Tire> | | | | | | | | | | | | |
| Durability (cord breaking) | no | no | no | no | no | no | yes | no | no | no | no | no |
| Damping performance | 2.5 | | 3.0 | | 3.0 | | 2.5 | | 3.0 | | 3.0 | |
| Cornering performance | 3.0 | | 3.0 | | 2.5 | | 3.0 | | 3.0 | | 2.5 | |

TABLE 2

|  | Com. Ex. 7 Carcass ply | | Com. Ex. 8 Carcass ply | | Com. Ex. 9 Carcass ply | | Com. Ex. 10 Carcass ply | | Com. Ex. 11 Carcass ply | | Com. Ex. 12 Carcass ply | |
|---|---|---|---|---|---|---|---|---|---|---|---|---|
|  | inner | outer | inner | outer | inner | outer | inner | outer | inner | outer | inner | outer |
| <Carcass cord> | | | | | | | | | | | | |
| Cord material | Aramid | | Aramid | | Aramid | | Aramid | | Aramid | | Aramid | |
| Cord structure | 800/2 (FIG. 3) | | 800/2 (FIG. 3) | | 800/2 (FIG. 3) | | 800/2 (FIG. 3) | | 800/2 (FIG. 3) | | 800/2 (FIG. 3) | |
| Total fineness (dtex) | 1600 | | 1600 | | 1600 | | 1600 | | 1600 | | 1600 | |
| Number of first twist/Number of final twist (time/10 cm) | 50/50 | | 55/55 | | 60/60 | | 70/70 | | 80/80 | | 90/90 | |
| Twist factor T | 2.0 | | 2.2 | | 2.4 | | 2.8 | | 3.2 | | 3.6 | |
| <Tire> | | | | | | | | | | | | |
| Durability (cord breaking) | yes | yes | yes | yes | yes | yes | no | no | no | no | no | no |
| Damping performance | 2.5 | | 2.5 | | 3.0 | | 3.5 | | 3.5 | | 4.0 | |
| Cornering performance | 3.5 | | 3.0 | | 3.0 | | 2.5 | | 2.5 | | 2.0 | |

TABLE 3

|  | Com. Ex. 13 Carcass ply | | Com. Ex. 14 Carcass ply | | Example 1 Carcass ply | | Example 2 Carcass ply | | Example 3 Carcass ply | | Com. Ex. 15 Carcass ply | |
|---|---|---|---|---|---|---|---|---|---|---|---|---|
|  | inner | outer | inner | outer | inner | outer | inner | outer | inner | outer | inner | outer |
| <Carcass cord> | | | | | | | | | | | | |
| Cord material | Aramid | | Aramid | | Aramid | | Aramid | | Aramid | | Aramid | |
| Cord structure | 800/3 (FIG. 4) | | 800/3 (FIG. 4) | | 800/3 (FIG. 4) | | 800/3 (FIG. 4) | | 800/3 (FIG. 4) | | 800/3 (FIG. 4) | |
| Total fineness (dtex) | 2400 | | 2400 | | 2400 | | 2400 | | 2400 | | 2400 | |
| Number of first twist/Number of final twist (time/10 cm) | 41/41 | | 45/45 | | 49/49 | | 57/57 | | 65/65 | | 73/73 | |
| Twist factor T | 2.0 | | 2.2 | | 2.4 | | 2.8 | | 3.2 | | 3.6 | |
| <Tire> | | | | | | | | | | | | |
| Durability (cord breaking) | yes | yes | yes | no | no | no | no | no | no | no | no | no |
| Damping performance | 2.5 | | 3.0 | | 3.0 | | 3.5 | | 4.0 | | 4.5 | |
| Cornering performance | 4.0 | | 4.0 | | 4.0 | | 3.5 | | 3.5 | | 2.5 | |

TABLE 4

|  | Com. Ex. 16 Carcass ply | | Com. Ex. 17 Carcass ply | | Com. Ex. 18 Carcass ply | | Example 4 Carcass ply | | Example 5 Carcass ply | | Com. Ex. 19 Carcass ply | |
|---|---|---|---|---|---|---|---|---|---|---|---|---|
|  | inner | outer | inner | outer | inner | outer | inner | outer | inner | outer | inner | outer |
| <Carcass cord> | | | | | | | | | | | | |
| Cord material | Aramid | | Aramid | | Aramid | | Aramid | | Aramid | | Aramid | |
| Cord structure | 1100/2 (FIG. 3) | | 1100/2 (FIG. 3) | | 1100/2 (FIG. 3) | | 1100/2 (FIG. 3) | | 1100/2 (FIG. 3) | | 1100/2 (FIG. 3) | |
| Total fineness (dtex) | 2200 | | 2200 | | 2200 | | 2200 | | 2200 | | 2200 | |

TABLE 4-continued

| | Com. Ex. 16 Carcass ply | | Com. Ex. 17 Carcass ply | | Com. Ex. 18 Carcass ply | | Example 4 Carcass ply | | Example 5 Carcass ply | | Com. Ex. 19 Carcass ply | |
|---|---|---|---|---|---|---|---|---|---|---|---|---|
| | inner | outer | inner | outer | inner | outer | inner | outer | inner | outer | inner | outer |
| Number of first twist/Number of final twist (time/10 cm) | 43/43 | | 47/47 | | 51/51 | | 60/60 | | 68/68 | | 77/77 | |
| Twist factor T | 2.0 | | 2.2 | | 2.4 | | 2.8 | | 3.2 | | 3.6 | |
| <Tire> | | | | | | | | | | | | |
| Durability (cord breaking) | yes | yes | yes | yes | yes | no | no | no | no | no | no | no |
| Damping performance | 2.5 | | 3.0 | | 3.0 | | 3.5 | | 4.0 | | 4.5 | |
| Cornering performance | 4.0 | | 4.0 | | 4.0 | | 3.5 | | 3.5 | | 2.5 | |

TABLE 5

| | Com. Ex. 20 Carcass ply | | Com. Ex. 21 Carcass ply | | Example 6 Carcass ply | | Example 7 Carcass ply | | Example 8 Carcass ply | | Com. Ex. 22 Carcass ply | |
|---|---|---|---|---|---|---|---|---|---|---|---|---|
| | inner | outer | inner | outer | inner | outer | inner | outer | inner | outer | inner | outer |
| <Carcass cord> | | | | | | | | | | | | |
| Cord material | Aramid | | Aramid | | Aramid | | Aramid | | Aramid | | Aramid | |
| Cord structure | 1100/3 (FIG. 4) | | 1100/3 (FIG. 4) | | 1100/3 (FIG. 4) | | 1100/3 (FIG. 4) | | 1100/3 (FIG. 4) | | 1100/3 (FIG. 4) | |
| Total fineness (dtex) | 3300 | | 3300 | | 3300 | | 3300 | | 3300 | | 3300 | |
| Number of first twist/Number of final twist (time/10 cm) | 35/35 | | 38/38 | | 42/42 | | 49/49 | | 56/56 | | 63/63 | |
| Twist factor T | 2.0 | | 2.2 | | 2.4 | | 2.8 | | 3.2 | | 3.6 | |
| <Tire> | | | | | | | | | | | | |
| Durability (cord breaking) | yes | yes | yes | no | no | no | no | no | no | no | no | no |
| Damping performance | 3.0 | | 3.0 | | 3.0 | | 3.5 | | 4.0 | | 4.5 | |
| Cornering performance | 4.0 | | 4.0 | | 4.0 | | 3.5 | | 3.5 | | 2.5 | |

TABLE 6

| | Com. Ex. 23 Carcass ply | | Com. Ex. 24 Carcass ply | | Example 9 Carcass ply | | Example 10 Carcass ply | | Example 11 Carcass ply | | Com. Ex. 25 Carcass ply | |
|---|---|---|---|---|---|---|---|---|---|---|---|---|
| | inner | outer | inner | outer | inner | outer | inner | outer | inner | outer | inner | outer |
| <Carcass cord> | | | | | | | | | | | | |
| Cord material | Aramid | | Aramid | | Aramid | | Aramid | | Aramid | | Aramid | |
| Cord structure | 1100/2/2 (FIG. 5) | | 1100/2/2 (FIG. 5) | | 1100/2/2 (FIG. 5) | | 1100/2/2 (FIG. 5) | | 1100/2/2 (FIG. 5) | | 1100/2/2 (FIG. 5) | |
| Total fineness (dtex) | 4400 | | 4400 | | 4400 | | 4400 | | 4400 | | 4400 | |
| Number of first twist/Number of final twist (time/10 cm) | 30/30 | | 33/33 | | 42/42 | | 42/42 | | 48/48 | | 54/54 | |
| Twist factor T | 2.0 | | 2.2 | | 2.4 | | 2.8 | | 3.2 | | 3.6 | |
| <Tire> | | | | | | | | | | | | |
| Durability (cord breaking) | yes | yes | yes | no | no | no | no | no | no | no | no | no |
| Damping performance | 3.0 | | 3.0 | | 3.0 | | 3.5 | | 4.0 | | 4.5 | |
| Cornering performance | 4.0 | | 4.0 | | 4.0 | | 3.5 | | 3.5 | | 2.5 | |

TABLE 7

| | Com. Ex. 26 Carcass ply | | Com. Ex. 27 Carcass ply | | Com. Ex. 28 Carcass ply | | Example 12 Carcass ply | | Example 13 Carcass ply | | Com. Ex. 29 Carcass ply | |
|---|---|---|---|---|---|---|---|---|---|---|---|---|
| | inner | outer | inner | outer | inner | outer | inner | outer | inner | outer | inner | outer |
| <Carcass cord> | | | | | | | | | | | | |
| Cord material | Aramid | | Aramid | | Aramid | | Aramid | | Aramid | | Aramid | |
| Cord structure | 1670/2 (FIG. 3) | | 1670/2 (FIG. 3) | | 1670/2 (FIG. 3) | | 1670/2 (FIG. 3) | | 1670/2 (FIG. 3) | | 1670/2 (FIG. 3) | |

TABLE 7-continued

|  | Com. Ex. 26 Carcass ply | | Com. Ex. 27 Carcass ply | | Com. Ex. 28 Carcass ply | | Example 12 Carcass ply | | Example 13 Carcass ply | | Com. Ex. 29 Carcass ply | |
| --- | --- | --- | --- | --- | --- | --- | --- | --- | --- | --- | --- | --- |
|  | inner | outer | inner | outer | inner | outer | inner | outer | inner | outer | inner | outer |
| Total fineness (dtex) | 3340 | | 3340 | | 3340 | | 3340 | | 3340 | | 3340 | |
| Number of first twist/Number of final twist (time/10 cm) | 35/35 | | 38/38 | | 42/42 | | 48/48 | | 55/55 | | 62/62 | |
| Twist factor T | 2.0 | | 2.2 | | 2.4 | | 2.8 | | 3.2 | | 3.6 | |
| <Tire> | | | | | | | | | | | | |
| Durability (cord breaking) | yes | yes | yes | yes | yes | no | no | no | no | no | no | no |
| Damping performance | 2.5 | | 3.0 | | 3.0 | | 3.5 | | 4.0 | | 4.5 | |
| Cornering performance | 4.0 | | 4.0 | | 4.0 | | 3.5 | | 3.5 | | 2.5 | |

TABLE 8

|  | Example 14 Carcass ply | | Example 15 Carcass ply | | Example 16 Carcass ply | | Example 17 Carcass ply | |
| --- | --- | --- | --- | --- | --- | --- | --- | --- |
|  | inner | outer | inner | outer | inner | outer | inner | outer |
| <Carcass cord> | | | | | | | | |
| Cord material | Aramid | Polyester | Polyester | Aramid | Aramid | Rayon | Rayon | Aramid |
| Cord structure | 1100/2 | 1670/2 | 1670/2 | 1100/2 | 1100/2 | 1840/2 | 1840/2 | 1100/2 |
| Total fineness (dtex) | 2200 | 3340 | 3340 | 2200 | 2200 | 3680 | 3680 | 2200 |
| Number of first twist/Number of final twist (time/10 cm) | 68/68 | 38/38 | 38/38 | 68/68 | 68/68 | 48/48 | 48/48 | 68/68 |
| Twist factor T | 3.2 | 2.2 | 2.2 | 3.2 | 3.2 | 2.9 | 2.9 | 3.2 |
| <Tire> | | | | | | | | |
| Durability (cord breaking) | no | no | no | no | no | no | no | no |
| Damping performance | 3.5 | | 3.5 | | 3.5 | | 3.5 | |
| Cornering performance | 4.0 | | 4.0 | | 4.0 | | 4.0 | |

It is observed in the tables that the tires of the Examples can improve the damping performance and cornering performance while suppressing breaking of cords to secure the tire durability.

What is claimed is:

1. A motorcycle tire for uneven terrain travel having a carcass extending from a tread portion to bead cores in bead portions through sidewall portions, said carcass comprising two carcass plies superposed in a radial direction of the tire as inner and outer carcass plies, in which carcass cords are arranged at an angle of 20 to 40° with respect to a circumferential direction of the tire and are covered with a topping rubber, each of said inner and outer carcass plies being an aramid ply using, as a carcass cord, an aramid fiber cord in which N (2 to 4) bundles of first-twisted aramid filaments are subjected to final twist, said aramid fiber cord having a total fineness D of 2,200 to 5,010 dtex and a twist factor T which is represented by the equation (1):

$$T = n \times (\sqrt{D}) \times 10^{-3} \quad (1)$$

in which n is the number of final twists per 10 cm of the cord, and D is a total fineness of the cord (unit: dtex), and which falls within the following range:

(a) a twist factor T within the range of 2.8 to 3.2 when said aramid ply is the inner carcass ply and the number N of filament bundles is 2, (b) a twist factor T within the range of 2.4 to 3.2 when said aramid ply is the inner carcass ply and the number N of filament bundles is 3 or 4, (c) a twist factor T within the range of 2.4 to 3.2 when said aramid ply is the outer carcass ply and the number N of filament bundles is 2, (d) a twist factor T within the range of 2.2 to 3.2 when said aramid ply is the outer carcass ply and the number N of filament bundles is 3 or 4, and the twist factor T of the aramid fiber cord used in the outer carcass ply is smaller than the twist factor T of the aramid fiber cord used in the inner carcass ply.

2. The motorcycle tire of claim 1, wherein said aramid fiber cord is formed by finally twisting two strands, each of said strands being formed by secondly twisting two bundles of first-twisted aramid filaments, and the number of first twists, the number of second twists and the number of finals final twists are identical to each other.

* * * * *